United States Patent [19]
Breau

[11] 3,785,059
[45] Jan. 15, 1974

[54] ROD GAUGE AND HOLDER

[76] Inventor: Mederic J. Breau, 236 Lincoln St., Saugus, Mass. 01752

[22] Filed: Nov. 23, 1971

[21] Appl. No.: 201,498

[52] U.S. Cl. .............................................. 33/178 B
[51] Int. Cl. ............................................ G01b 3/50
[58] Field of Search ...................... 33/147 K, 168 R, 33/168 B, 178 B, 199 R, 178 R; 287/118

[56] References Cited
UNITED STATES PATENTS
2,582,679  1/1952  Carroll ............................ 33/178 B
2,645,023  7/1953  Trbojevich ...................... 33/168 R
1,646,255  10/1927  Muehleman .................. 33/178 R X
3,497,250  2/1970  Sommer ........................ 33/178 R X OTHER PUBLICATIONS
Practical Ideas, American Machinist, Dec. 15, 1958, pg. 126.

Primary Examiner—Louis R. Prince
Assistant Examiner—Charles E. Phillips
Attorney—David A. Rich et al.

[57] ABSTRACT

A rod gauge and holder with rods clamped together between two V-blocks in a framework in order to use the combined diameters of the rods to form a fixed gauge of the go or no-go type for testing a dimension of an opening in a work piece.

8 Claims, 7 Drawing Figures

PATENTED JAN 15 1974 3,785,059
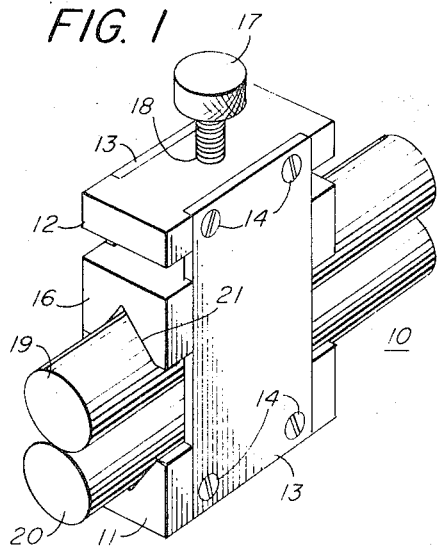
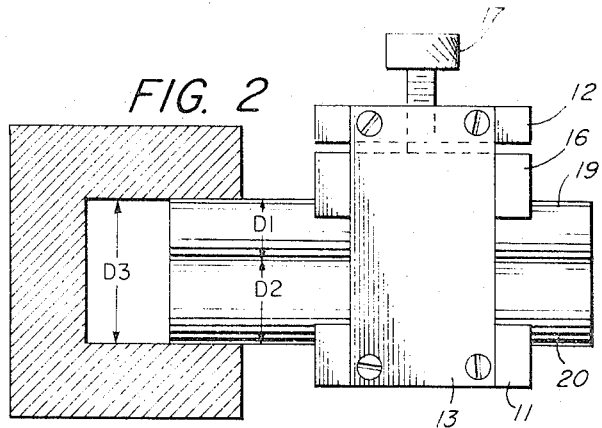
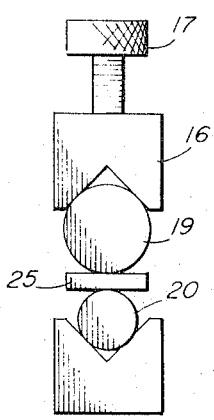
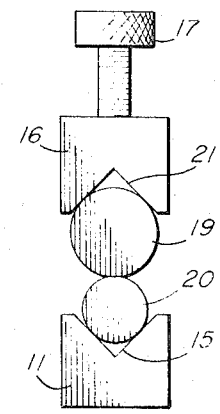
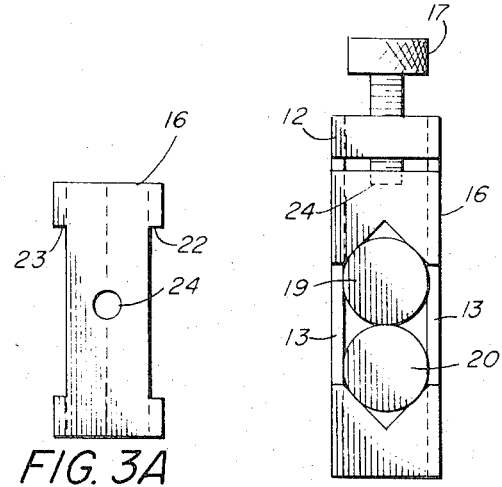
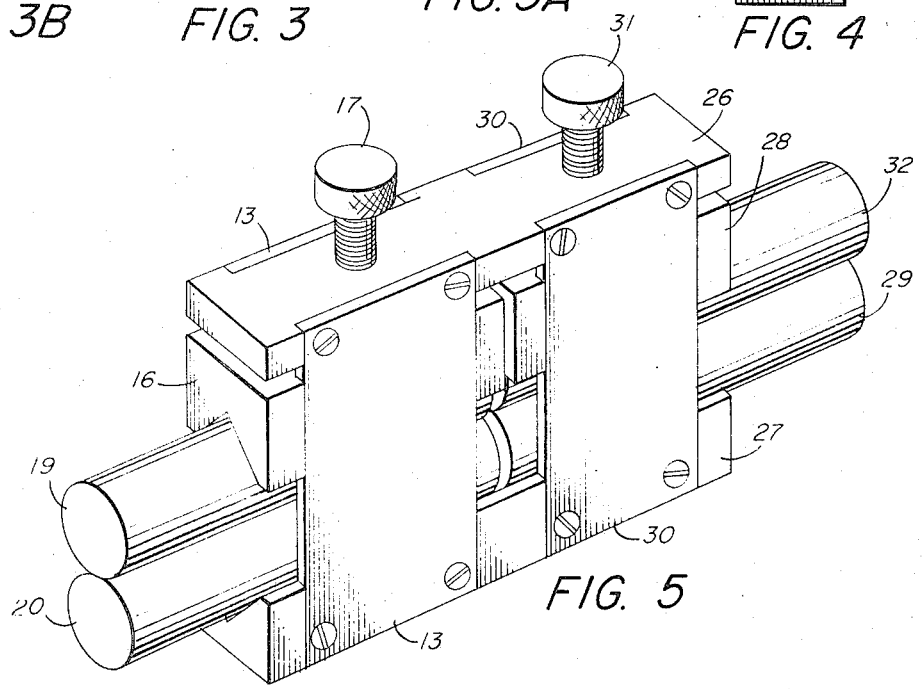

ROD GAUGE AND HOLDER

The present invention relates to plug gauges for testing a dimension of an opening in a work piece by attempted insertion into the opening with pin or rod gauges.

When prior art plug gauges typically using a single rod are inserted into a circular opening having no other access to the atmosphere, it is necessary to force the gauge against the effect of compressing the air.

Furthermore, such prior art plug gauges are limited to measurements of circular holes or openings in a work piece.

A plug gauge disclosed in U.S. Pat. No. 2,392,317 issued Jan. 8, 1946 invented by C. W. Eisele reveals a tubular housing carrying two rod gauge elements. That gauge, however, fails to overcome the problem of adjustability, i.e., each tube holder is limited to a narrow range of gauge measurements.

It is, therefore, an object of the present invention to provide improved rod gauge means which avoid the compression problem.

Another object of the invention is to provide an adjustable rod gauge means capable of a relatively large range of measurements; e.g., from 0.250 to 0.500 inches.

A further object of the invention is to provide improved rod gauge means useful for gauging irregular openings.

Yet another object of the invention is to provide rod gauge means of high precision while being simple and reliable in construction and use.

Other and further objects of the invention will be apparent from the description below, taken in connection with the accompanying drawings.

In accordance with the invention there is provided a rod gauge means. The rod gauge includes a fixed, elongated clamping bar means. Longitudinal surfaces are formed therein providing a V-shaped groove for engaging a first cylindrical rod. Movable elongated clamping bar means are movably coupled to the fixed bar means. Longitudinal surfaces formed therein provide a V-shaped groove opposing the fixed groove for engaging a second cylindrical rod. Means are provided for adjusting and securing the position of the movable bar means relative to the fixed bar means to clamp the rods therebetween. The rods are positioned in parallel along the grooves and in tangential contact. The sum of the diameters of the rods provides a gauge for a dimension for an opening in a work piece.

IN THE DRAWINGS

FIG. 1 is an oblique view of the rod gauge means of the invention;

FIG. 2 is a side view partly sectional, illustrating the use of the rod gauge means of the invention;

FIG. 3 is a partially schematic, end view of the rod gauge means of the invention illustrating an aspect of its operation, FIG. 3A is a plan view of a clamping bar;

FIG. 3B is an end view of a modification of the invention;

FIG. 4 is an end view of the rod gauge means of the invention;

FIG. 5 is an oblique view of a modification of the rod gauge means in FIG. 1 illustrating a go-no-go gauge.

ROD GAUGE IN FIGS. 1-4

Referring now to the drawings, wherein like numerals refer to like parts, and with particular reference to FIG. 1, there is here illustrated a rod gauge means of the invention.

The rod gauge is generally indicated at 10. A fixed, elongated clamp bar 11 is secured to a bar member 12 by means of a parallel pair of side plates 13 fastened thereto by fastener screws 14. The plates are recessed into opposite sides of the bar member and fixed clamping bar 11, as shown. Longitudinal surfaces in the clamping bar 11 form a V-shaped groove 15, shown in FIG. 3.

A movable, elongated clamping bar 16 is coupled to the bar member 12 by a set screw 17. The screw is rotatably coupled to the bar 16 by conventional means and is in threaded engagement with the bar member 12 through a threaded hole 18 formed in the bar member. Longitudinal surfaces in the bar 16 form a groove 21. The clamping bars 11 and 16 receive a pair of rod gauges 19 and 20 which are positioned in parallel in the bar grooves and in tangential contact as shown. The rods may differ in diameter as shown in FIG. 2.

A plan view of the movable clamping bar 16 is shown in FIG. 3A illustrating channels 22 and 23 formed in the bar 16. The channels provide tracks which ride up and down the side panels 13.

In one form of the invention the set screw 17 engages the movable bar 16 only for the purpose of depressing it. With the pins removed, the bar 16 is free to fall into contact with the fixed bar 11.

In the end view of FIG. 4 a countersink hole 24 is shown formed in the movable bar 16 to receive the set screw 17. In the end view of FIG. 3B a modification of the invention is shown illustrating the use of a rectangular gauge block 25 clamped between the rod gauges 19 and 20.

The invention considerably extends the useful range of rod gauges normally available. The rod gauges may be used individually down to their minimum range. The range is then extended by pairing them in the manner of the present invention to obtain any desired dimension for gauging an opening. Thus, in FIG. 2, the dimension D1 may, for example, be 0.2501 inches. The dimension D2 may be 0.2240 inches to provide a precise measure of 0.4741 inches. The gauge block 25 may be "feeler" gauge elements for varying the total dimension in available desired increments, as shown in FIG. 3B.

To use the rod gauge of the present invention, the set screw 17 is turned until the movable block 16 is directed upwardly to receive a pair of gauges 19 and 20. The set screw is then turned towards the movable bar 16 until it is firmly secured, clamping the rod gauges 19 and 20 together between the clamping bars 11 and 16.

Modification of the invention as shown in FIG. 5

Referring now to FIG. 5, there is here illustrated a go-no go gauge wherein a unitary bar member 26 is extended and a fixed clamping bar 27 is also extended to provide a pair of rod gauges. The rods 19 and 20 together provide a go dimension. The rods 29 and 32 together provide a no-go dimension. An additional movable clamping bar 28 similar to the bar 16 is provided and its position is adjusted by the set screw 31. An additional pair of side plates 30 are secured to opposite sides of the bar member 26 and the fixed clamping bar 27.

It will be apparent that a go-no go gauge may be constructed by having each rod element 19 and 20, as shown in FIG. 1, extend from the opposite ends of the gauge. Thus element 19 would extend to the left, as shown, and element 20 to the right. Element 19 may have the correct diameter and element 20 a larger diameter, as required.

The gauge may be constructed with a handle in any well known manner; e.g., the handle may extend from the fixed bars 11 and 12.

While there has hereinbefore been presented the preferred embodiments of the invention, it will be apparent to those of ordinary skill in the art that many variations and changes comes within the scope of the invention. All such variations and changes are therefore to be considered a part of the invention.

What is claimed is:

1. Rod gauge means, comprising:
a first cylindrical gauge rod;
a second cylindrical gauge rod;
fixed, elongated, clamping bar means having longitudinal surfaces forming a V-shaped groove therein for engaging said first cylindrical rod;
movable elongated clamping bar means movably coupled to said fixed bar means and having longitudinal surfaces forming a V-shaped groove therein for engaging said second cylindrical rod; and
means for adjusting and securing the position of said movable bar means relative to said fixed bar means to clamp said first and second gauge rods therebetween with said rods positioned in parallel along said grooves and in tangential contact, the sum of the diameters of the rods providing a gauge for a dimension of an opening in a work place.

2. Rod gauge means of claim 1, wherein:
said rod gauge means further comprises:
a third cylindrical gauge rod;
a fourth cylindrical gauge rod;
second movable elongated clamping bar means movably coupled to said fixed bar means and having longitudinal surfaces forming a V-shaped groove therein for engaging said fourth cylindrical gauge rod, and said fixed bar means being adapted to engage a third cylindrical gauge rod along its groove; and
second means for adjusting and securing the position of said second movable bar means relative to said fixed bar means to clamp said third and fourth gauge rods therebetween with said rods positioned in parallel along said grooves and in tangential contact, whereby the sum of the diameters of the third and fourth rods provides a second gauge for a dimension of an opening in a work piece.

3. Rod gauge means of claim 1, wherein:
said adjusting and securing means includes a bar member in a fixed relation to said fixed bar means and a set screw in threaded engagement through said bar member and rotatably coupled to said movable bar means.

4. The rod gauge means of claim 3, wherein:
a parallel pair of side plates are recessed into and fastened to opposite sides of said bar member and said fixed bar means with said movable bar means positioned by said set screw between said side plates.

5. The rod gauge means of claim 4, wherein:
the gross cross-section of said gauge means is rectangular.

6. The rod gauge means of claim 1, wherein:
the diameters of said first and second rods are different.

7. The rod gauge means of claim 1, wherein:
The gauge rods differ in diameter and each rod extends from opposite ends of said grooves.

8. The rod gauge means of claim 1, wherein:
a rectilinear gauge member is positioned and clamped between said rods.

* * * * *